United States Patent [19]
Kubo et al.

[11] Patent Number: 5,170,936
[45] Date of Patent: Dec. 15, 1992

[54] HEAT PUMP TYPE HEATING APPARATUS AND CONTROL METHOD THEREOF

[75] Inventors: Toru Kubo; Katsuaki Yamagishi, both of Kanagawa, Japan

[73] Assignee: Kabushiki Kaisha Toshiba, Kawasaki, Japan

[21] Appl. No.: 542,832

[22] Filed: Jun. 25, 1990

[30] Foreign Application Priority Data

Jul. 6, 1989 [JP] Japan .................. 1-172882

[51] Int. Cl.$^5$ ........................................... G05D 23/00
[52] U.S. Cl. .................... 237/2 B; 62/324.1; 165/39; 165/49
[58] Field of Search ............ 237/2 B; 62/235.1, 324.1, 62/324.6, 238.6, 160, 196.4, 197, 198, 199; 165/39, 14, 27, 30, 49

[56] References Cited
FOREIGN PATENT DOCUMENTS
61-145244  9/1986  Japan .

Primary Examiner—Henry A. Bennet
Attorney, Agent, or Firm—Foley & Lardner

[57] ABSTRACT

A heat pump type apparatus with an air heating mode which heats a whole space using an internal heat-exchanger, a floor heating mode which heats the floor around the space using a floor heating panel, and a combined use of both type heating. In the combined use mode, the apparatus compensates the desired preset room temperature by a specified value in response to the results of a comparison of an actual floor temperature and a desired preset floor temperature.

11 Claims, 8 Drawing Sheets

| PERIOD | SOLENOID VALVE ||||  OUTPUT FREQUENCY OF INVERTER CIRCUIT Hz | INTENSITY OF INTERNAL FAN | PRESET ROOM TEMPERATURE |
| --- | --- | --- | --- | --- | --- | --- | --- |
| | V1 | V2 | V3 | V4 | | | |
| ① | OPEN | OPEN | CLOSE | CLOSE | MIDDLE | LOW | $T_s$ |
| ② | OPEN | OPEN | OPEN | OPEN | MAXIMUM | LOW | $T_s$ |
| ③ | OPEN | OPEN | OPEN | OPEN | UNDER CONTROL | LOW | $T_s$ |
| | OPEN | OPEN | OPEN | OPEN | UNDER CONTROL | ULTRA LOW | $T_s - \Delta T$ |

Fig.6.

| PERIOD | SOLENOID VALVE | | | OUTPUT FREQUENCY OF INVERTER CIRCUIT Hz | INTENSITY OF INTERNAL FAN | PRESET ROOM TEMPERATURE |
|---|---|---|---|---|---|---|
| | V2 | V3 | V4 | | | |
| ① | CLOSE | OPEN | OPEN | MAXIMUM | HIGH | $T_s$ |
| | CLOSE | OPEN | OPEN | UNDER CONTROL | LOW | $T_s$ |
| ② | CLOSE | OPEN | OPEN | UNDER CONTROL | ULTRA LOW | $T_s - \Delta T$ |

FIG. 10A

| PERIOD | SOLENOID VALVE | | | OUTPUT FREQUENCY OF INVERTER CIRCUIT Hz | INTENSITY OF INTERNAL FAN | PRESET ROOM TEMPERATURE |
|---|---|---|---|---|---|---|
| | V2 | V3 | V4 | | | |
| ① | OPEN | CLOSE | CLOSE | MIDDLE | LOW | $T_s$ |
| ② | CLOSE | OPEN | OPEN | MAXIMUM | LOW | $T_s$ |
| | CLOSE | OPEN | OPEN | UNDER CONTROL | LOW | $T_s$ |
| ③ | CLOSE | OPEN | OPEN | UNDER CONTROL | ULTRA LOW | $T_s - \Delta T$ |

FIG. 10B

HEAT PUMP TYPE HEATING APPARATUS AND CONTROL METHOD THEREOF

BACKGROUND OF THE INVENTION

1. Field of the Invention

The present invention relates, in general, to a heat pump type heating apparatus which is capable of both air heating and floor heating. More specifically, the invention relates to a heat pump type heating apparatus which controls the heating condition for creating a comfortable and relaxing atmosphere.

2. Description of the Related Art

For heating of dwellings, an air heating system or a floor heating system is widely used. Generally, for combined operation of air heating and floor heating, a heat pump type heating device is well-known for its ability to provide air heating along with floor heating. Therefore, in a heat pump type heating device, there are three operating modes, i.e., air heating, floor heating and a combined operation of air heating and floor heating.

In a conventional heat pump type heating apparatus, the user is able to select the prefered operating mode. Also, he or she is able to set preferred room temperature and floor temperature.

For example, this type of heating apparatus is found in Japanese Utility Model Disclosure (Kokai) No. 61-145244. As to the temperature at which human beings feel comfortable, many studies have been done. It is said that keeping the head cool and the feet warm is more comfortable.

An overly warmed room makes humans feel uncomfortable. In the heat pump type apparatus mentioned above, however, the setting of the room temperature is not changed depending on whether the floor heating (mode) is operated or not.

SUMMARY OF THE INVENTION

Accordingly, it is an object of the present invention to provide an improved heat pump type heating apparatus wherein the preset room temperature can be controlled at comfortable level. It is a further object of the present invention to provide a heat pump type heating apparatus which is good in thermal efficiency. It is still a further object of the present invention to provide a method for controlling a heat pump type heating apparatus providing both air heating and floor heating.

In accordance with the present invention, the foregoing objects are achieved by providing, a heat pump type heating apparatus includes an internal heat-exchanger heating the air surrounding it, a floor heating panel heating the floor surface surrounding it, a first temperature sensor for outputting a temperature signal indicating the temperature of the air, a second temperature sensor for outputting a temperature signal indicating the temperature of the area near the floor surface and a controller input desired room temperature data and desired floor temperature data, and compares the desired room temperature with the output signal from the first temperature sensor and the desired floor temperature with the output signal from the second temperature sensor, and controls the internal heat-exchanger and the floor heating panel in response to the results of the comparison. The heating apparatus further includes an internal fan device for supplying air flow to the internal heat-exchanger, a variable capacity compressor for compressing a gaseous refrigerant fluid to be supplied to the internal heat-exchanger and the floor heating panel, and an inverter circuit for supplying a variable driving frequency to the compressor.

BRIEF DESCRIPTION OF THE DRAWINGS

These and other objects and advantages of this invention will become more apparent from the following detailed description of the presently preferred embodiment of the invention, taken in conjunction with the accompanying drawings of which:

FIG. 6 is an other type of control map illustrating the status of each part shown in FIG. 1;

FIGS. 10A and 10B are control maps illustrating the status of each part shown in FIG. 9:

DETAILED DESCRIPTION OF THE PREFERRED EMBODIMENT

The preferred embodiment of the present invention will now be described in more detail with reference to the accompanying drawings.

Figure 1:
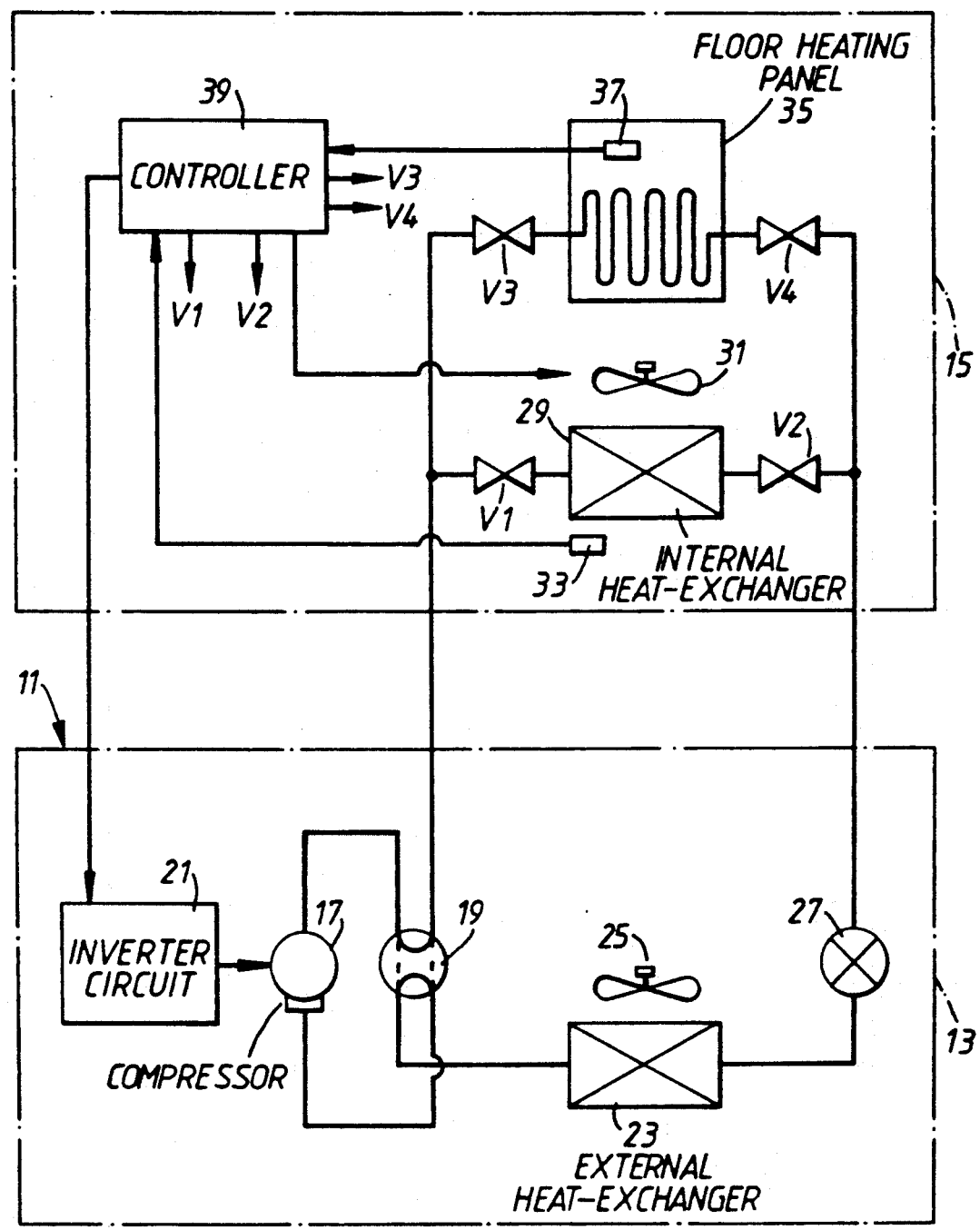
FIG. 1 is a circuit diagram illustrating a refrigerating circuit device of one embodiment of the present invention.

In FIG. 1, a heat pump type refrigerating circuit 11 includes an external unit 13 and an internal unit 15. The external unit 13 includes a variable capacity compressor 17, an inverter circuit 21 for varying the number of compressor revolutions, a four-way valve 19, an external heat-exchanger 23 and a pressure reducing device, e.g., an expansion valve 27. In the heating operation, the four-way valve 19 is set the position as showed in the continuous line. In the cooling operation, the four-way valve 19 is set the position as showed in the dotted line. The internal unit 15 includes an internal heat-exchanger 29, a floor heating panel 35 and a controller 39. The output side of the compressor 17 is connected in parallel to one side of the internal heat-exchanger 29 through the four-way valve 19 and a solenoid valve V1 and to one side of the floor heating panel through the four-way valve 19 and a solenoid valve V3. The other side of the internal heat-exchanger 29 and the other side of the floor heating panel 35 are connected in parallel to one side of the expansion valve 27 through a solenoid valve V2 and a solenoid valve V4 respectively. The other side of the expansion valve 27 is connected to one side of the external heat-exchanger 23. The other side of the external heat-exchanger 23 is connected to the input side of the compressor 17 through the four-way valve 19.

A room temperature sensor 33 is arranged close to the internal heat-exchanger 29 for detecting the room temperature. The output signal of the room temperature sensor 33 is input to the controller 39. A floor temperature sensor 37 is arranged close to the floor heating panel 35 for detecting the floor temperature. The output signal of the floor temperature sensor 37 is input to the controller 39.

As shown in FIG. 1, an internal fan device 31 is arranged close to the internal heat-exchanger 29 for supplying air to the internal heat-exchanger 29. An external fan device 25 is disposed close to the external heat-exchanger 23 for supplying air to the external heat-exchanger 23. The control signal from the controller 39 is supplied to the internal fan device 31 for controlling the rotation of internal fan device 31. The control signal from the controller 39 is also supplied to the solenoid valves V1-V4 for switching control of the seleniod valves V1-V4. Furthermore, output signal from the controller 39 is supplied to the inverter circuit 21 for controlling the output frequency of the inverter circuit 21.

Figure 2:
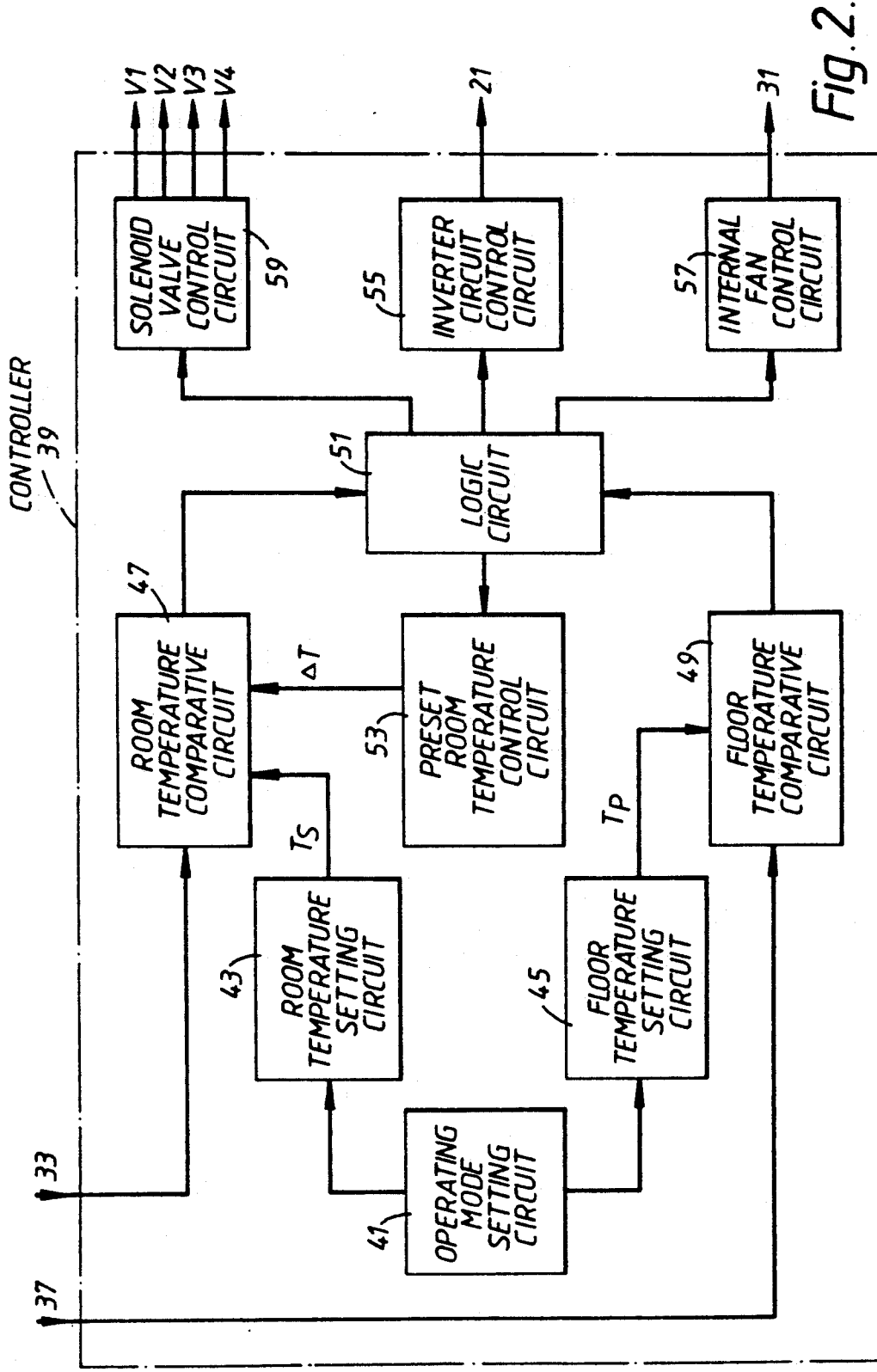
FIG. 2 is a more detailed view of the controller shown in FIG. 1.

Referring now to FIG. 2, there is provided a more detailed view of the controller 39 of the preferred embodiment of the present invention. The controller 39 includes an operating mode setting circuit 41, a room temperature setting circuit 43 and a floor temperature setting circuit 45. Preferably, the operating mode setting circuit 41 has keys or buttons (not shown), each of which corresponds to one of the operating modes, e.g., air heating, floor heating and combined use, of the refrigerating circuit 11. Therefore, the operating mode setting circuit 41 responds to the selection of the operating mode by an operator. Thus, the operationg mode setting circuit 41 allows the operator to set the desired room temperature at the room temperature setting circuit 43 and the desired floor temperature at the floor temperature setting circuit 45. Data representing the preset room temperature Ts is supplied to a room temperature comparative circuit 47. Furthermore, the actual room temperature, which is measured by the room temperature sensor 33, is supplied to the room temperature comparative circuit 47. Thus, the room temperature comparative circuit 47 compares the actual room temperature with the preset room temperature Ts and outputs the result of comparison. The output information from the room temperature comparative circuit 47 is applied to a logic circuit 51. On the other hand, the data of preset floor temperature Tp is supplied to a floor temperature comparative circuit 49. Furthermore, the actual floor temperature which is measured by the floor temperature sensor 37 is applied to the floor temperature comparative circuit 49. Thus, the floor temperature comparative circuit 49 makes a comparison between the actual floor temperature and the preset floor temperature Tp and outputs the result of comparison. The output information from the floor temperature comparative circuit 49 is supplied to the logic circuit 51.

The controller 39 further includes a preset room temperature control circuit 53, an inverter circuit control circuit 55, an internal fan control circuit 57 and a solenoid valve control circuit 59. Receiving the output information from both comparative circuits 47 and 49, the logic circuit 51 controls the preset room temperature control circuit 53.

In combined use of air heating and floor heating , when the actual floor temperature reaches the preset floor temperature Tp, the logic circuit 51 outputs the control signal to the preset room temperature control circuit 53. Thus, the preset room temperature control circuit 53 outputs a compensatory data $\Delta T$ which corresponds to a more comfortable room temperature. As a result, the preset room temperature newly is changed by $\Delta T$. Furthermore, the logic circuit 51 controls the inverter circuit control circuit 55, the internal fan device control circuit 57 and the solenoid valve control circuit 59 respectively, in accordance with the output information from both comparative circuits 47 and 49. The inverter circuit control circuit 55 outputs the control signal to the inverter circuit 21. The internal fan control circuit 57 outputs the control signal to the internal fan device 31. In like manner, the solenoid valve control circuit 59 outputs the control signal to the solenoid valves V1-V4, respectively.

Figure 3:
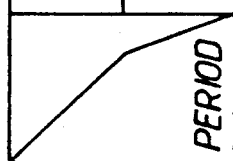
FIG. 3 is a one type of control map illustrating the status of each part shown in FIG. 1.
Figure 4:
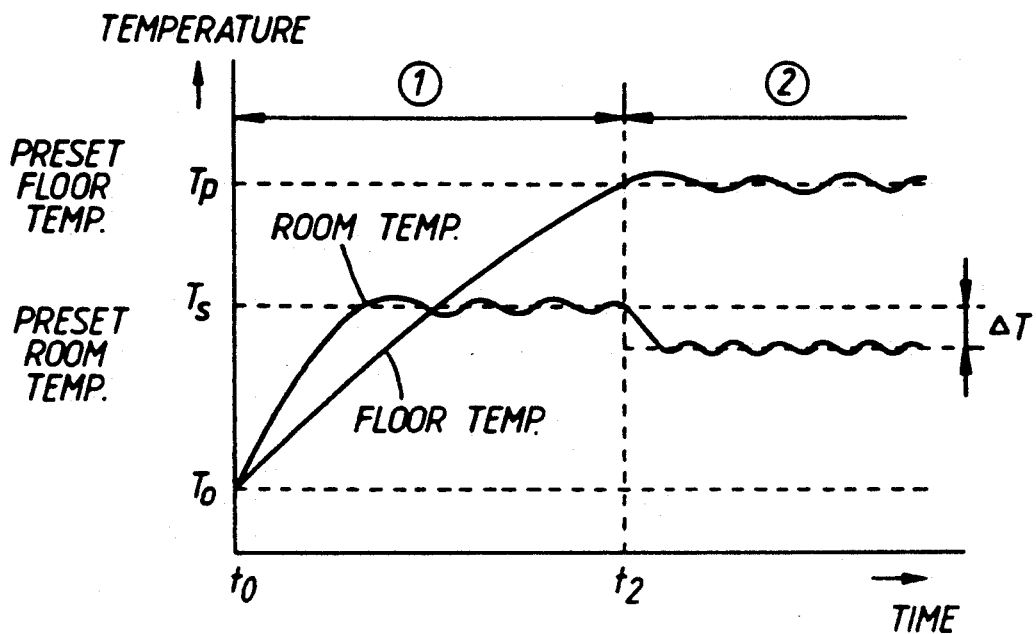
FIG. 4 is graph illustrating the change of room temperature and floor temperature by the control shown in FIG. 3.
Figure 5A:
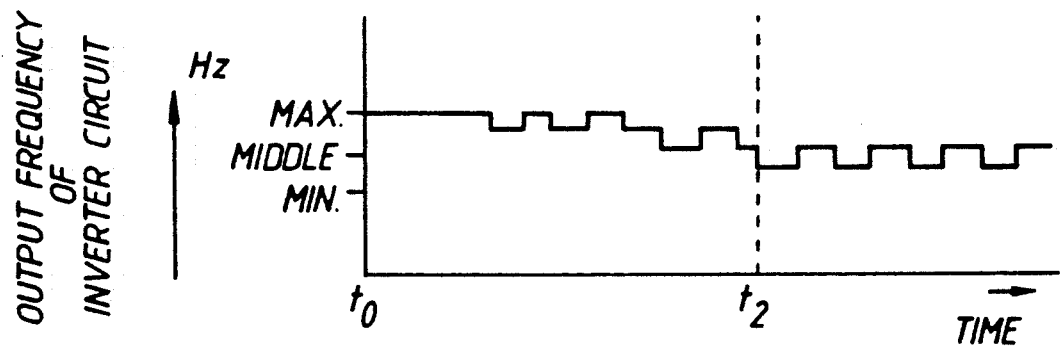
FIGS. 5A and 5B are wave forms explaining the operation of the inverter circuit and the internal fan device by the control shown in FIG. 3.
Figure 5B:
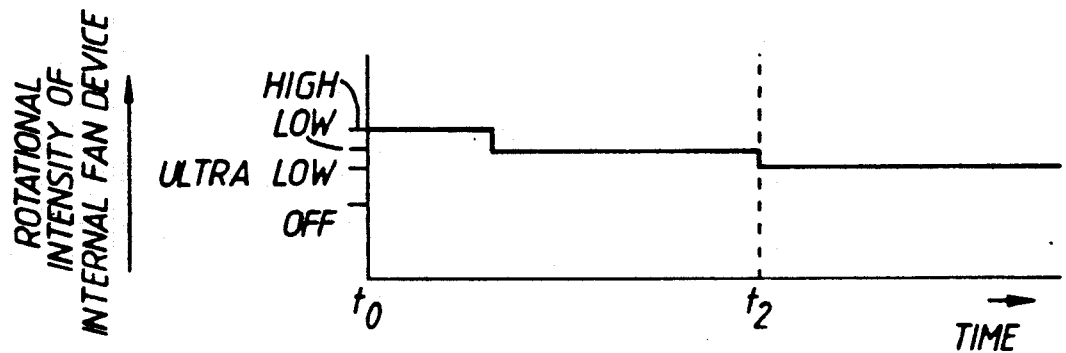

Now, referring to FIG. 3 through FIG. 5, there is provided detail description of the operation of the controller 39. FIG. 3 illustrates detail control statuses of the solenoid valves V1-V4,the inverter circuit 21 and the internal fan device 31 in each period, e. g., ①, ② shown FIG. 4A. In FIG. 4A, period ① indicates a duration in which until the floor temperature reaches to the preset floor temperature Tp and period ② indicates a duration after period ①. At the time $t_0$ in FIG. 4, the air heating by using the internal heat-exchanger 29 and the floor heating by using the floor heating panel 35 will be started in succession. Specifically, the solenoid valves V1-V4 are controlled as "OPEN", respectively. Further, the internal fan device 31 is controlled as "HIGH". At this time, by controlling the output frequency of the inverter circuit 21 to be "MAXIMUM", the number of revolutions of the compressor 17 is controlled to be the maximum. In a minute, the solenoid valve V1 is moved to "CLOSE", but the internal fan device 31 continues at the "HIGH" operation. The preset room temperature Ts has been set to a prescribed temperature (e.g., 23° C.) by the room temperature setting circuit 43 in the controller 39 beforehand. In the same manner, the preset floor temperature Tp has been set to a prescribed temperature (e.g., 30° C.) by the floor temperature setting circuit 45 in the controller 39 beforehand.

By means of the combined heating operation, the initial temperature To of the room temperature goes up toward the preset room temperature Ts. Concerning the floor temperature, it also goes up toward the preset floor temperature Tp from the initial temperature To. As mentioned above, the room temperature comparative circuit 47 compares the room temperature which is detected at the room temperature sensor 33 with the preset room temperature Ts. Once the room temperature reaches the preset room temperature Ts, the logic circuit 51 in the controller 39 outputs a control signal to the inverter circuit control circuit 55 and the internal fan control circuit 57, respectively. Specifically, the output frequency of the inverter circuit 21 is reduced to "UNDER CONTROL" as shown FIG. 3 and FIG. 5. Thus, the number of revolutions of compressor 17 is also gone down. Furthermore, the air flow of the internal fan device 31 is adjusted to "LOW". As a result, the room temperature is controlled to keep it in conformity with the preset room temperature Ts.

Next, the floor temperature comparative circuit 49 compares the floor temperature which is detected at the floor temperature sensor 37 with the preset floor temperature Tp. As shown FIG. 4, in period ②, once the floor temperature reaches to the preset floor temperature Tp, the logic circuit 51 in the controller 39 outputs a control signal to the inverter circuit control circuit 55 and the internal fan control circuit 57, respectively. Specifically, the output frequency of the inverter circuit 21 is further reduced to "UNDER CONTROL" as shown FIG. 5A. Thus, the number of revolutions of the compressor 17 is also reduced. Furthermore, the air flow of the internal fan device 31 is adjusted to "ULTRA LOW". As a result, the floor temperature is controlled to keep it in conformity with the preset floor temperature Tp.

In this embodiment, once the floor temperature reaches the preset floor temperature Tp, the logic circuit 51 of the controller 39 performs the temperature control in the following manner. The logic circuit 51 outputs the control signal to the preset room temperature control circuit 53. Receiving the control signal from the logic circuit 51, the preset room temperature control circuit 53 decides the adjustment degree $\Delta T$. Thus, this control data is sent to the room temperature comparative circuit 47. As a result, the preset room temperature is newly compensated by $\Delta T$, e.g., it will be set as $Ts - \Delta T$.

Figure 7:
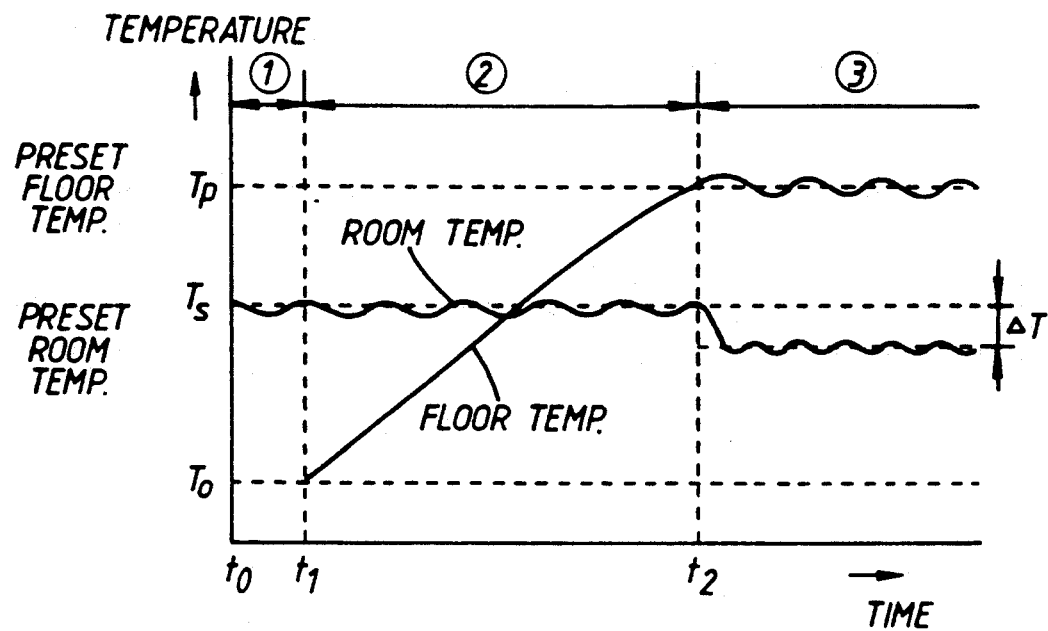
FIG. 7 is a graph illustrating the change of room temperature and floor temperature by the control shown in FIG. 6.

In the description mentioned above, the air heating and the floor heating are simultaneously at work from the start. But it is possible to operate only the air heating at first, with the floor heating to be operated thereafter. FIG. 6 illustrates detailed control status of the solenoid valves V1-V4, the inverter circuit 21, and the internal fan device 31 in each period, e.g. ①, ② and ③ shown FIG. 7. In FIG. 7, period ① indicates a duration in which only air heating is operated. Specifically, the solenoid valves V1 and V2 are controlled as "OPEN" and the solenoid valves V3 and V4 are controlled as "CLOSE". Further, the internal fan device 31 is controlled as "LOW". At this time, by controlling the output frequency of the inverter circuit 21 to "MIDDLE", the number of revolutions of the compressor 7 is controlled to a middle range. Thus, the room temperature is controlled to conform to the preset room temperature Ts.

Figure 8A:
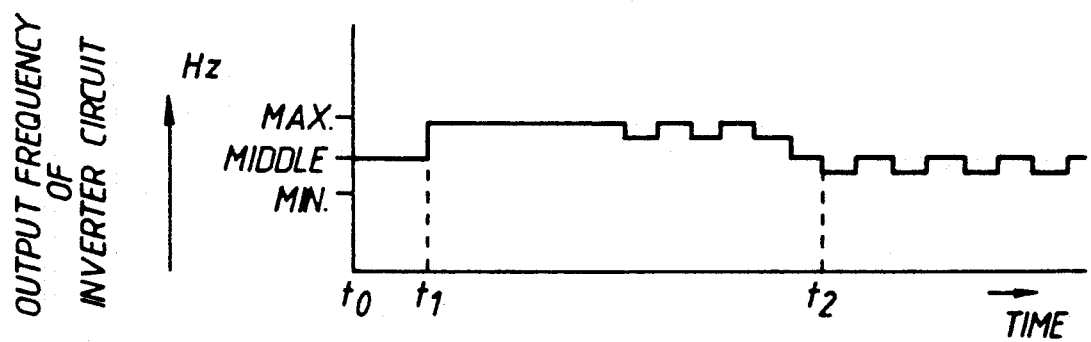
FIGS. 8A and 8B are wave forms explaining the operation of the inverter circuit and the internal fan device by the control shown in FIG. 6.
Figure 8B:
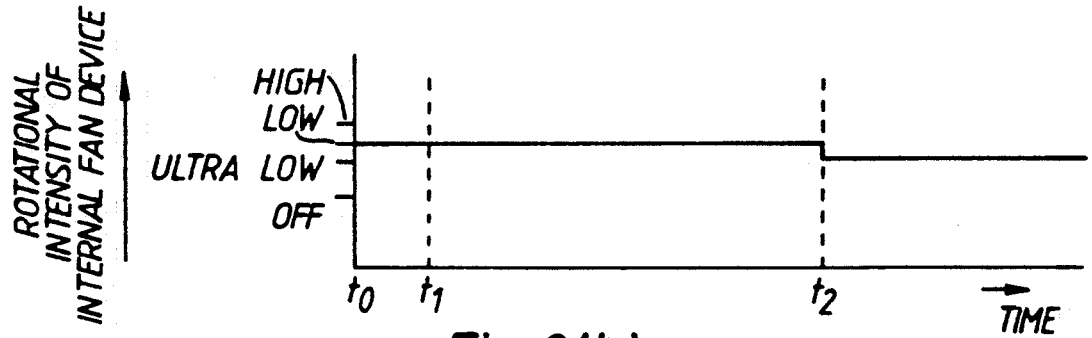

At the time $t_1$ in FIG. 7, the floor heating will be started, with the air heating continuing. In FIG. 7, period ② indicates a period during which the floor temperature reaches the preset floor temperature Tp and period ③ indicates the time after period ②. Specifically, all the solenoid valves V1-V4 are controlled as "OPEN", respectively. At this time, by controlling the output frequency of the inverter circuit 21 to "MAXIMUM", the number of revolutions of the compressor 17 is controlled to be maximum. Further, the internal fan device 31 continues in the "LOW" operation. The preset room temperature Ts has been set to a prescribed temperature (e.g., 23° C.) by the room temperature setting circuit 43 in the controller 39 beforehand. The preset floor temperature Tp has been set to a prescribed temperature (e.g., 30° C.) by the floor temperature setting circuit 45 in the controller 39 beforehand. The initial temperature To of the floor temperature goes up toward the preset floor temperature Tp. At this time the room temperature is controlled to conform to the preset room temperature Ts. As shown in FIG. 7, within period ②, once the floor temperature reaches to the preset temperature Ts, the logic circuit 51 in the controller 39 outputs the control signal to the inverter circuit control circuit 55. Specifically, the output frequency of the inverter circuit 21 is reduced to "UNDER CONTROL" as shown FIG. 6 and FIG. 8.

Next, the floor temperature comparative circuit 49 compares the floor temperature which is detected at the floor temperature sensor 37 with the preset floor temperature Tp. As shown FIG. 7, in period ③, once the floor temperature reaches to the preset floor temperature Tp, the logic circuit 51 in the controller 39 outputs the control signal to the inverter circuit control circuit 55 and the internal fan control circuit 57, respectively. Specifically, the output frequency of the inverter circuit 21 is further reduced to "UNDER CONTROL" as shown FIG. 8A. Thus, the number of revolutions of the compressor 17 is also reduced. Furthermore, the air flow of the internal fan device 31 is adjusted to "ULTRA LOW". As a result, the floor temperature is controlled to keep it in conformity with the preset floor temperature Tp. Here, because the floor temperature has reached the preset floor temperature Tp, the logic circuit 51 of the controller 39 performs the control in the following manner. The logic circuit 51 outputs the control signal to the preset room temperature control circuit 53. Receiving the control signal from the logic circuit 51, the preset room temperature control circuit 53 decides the adjustment degree $\Delta T$ required. Thus, this control data is sent to the room temperature comparative circuit 47. As a result, the preset room temperature is newly compensated by $\Delta T$ (e.g., 3° C.). Therefore, it will be set as $Ts - \Delta T$. Thus, a more comfortable and relaxing atmosphere is presented because the room temperature is controlled not too high during the combined use of air heating and floor heating.

Figure 9:
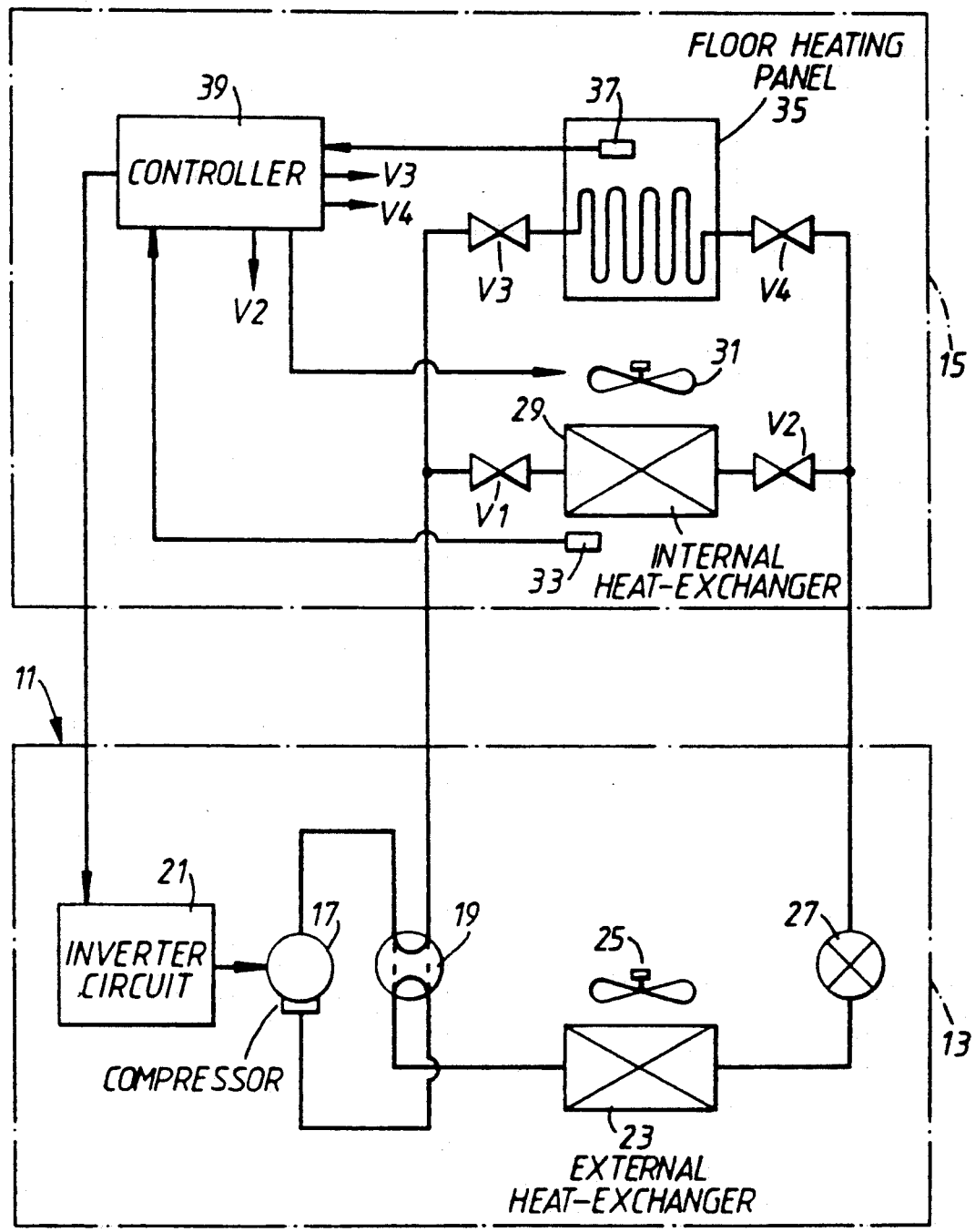
FIG. 9 is circuit diagram illustrating a refrigerating circuit device of other embodiment of the present invention.

A second embodiment of the present invention will now be described with reference to FIGS. 9 and 10. The arrangement of FIG. 9 connects the floor heating panel 35 and the internal heat-exchanger 29 in series through three solenoid valves V2, V3 and V4. Other elements of the heat-pump type refrigerating circuit 11 shown in FIG. 9 are similar to that of the heat-pump type refrigerating circuit 11 shown in FIG. 1. Thus, the same numerals are applied to similar elements and therefore a detailed description thereof is not repeated. In this embodiment, the solenoid valves V2-V4 are controlled as shown FIGS. 10A, 10B. The contents of FIG. 10A corresponds to those of FIG. 3. Specifically, FIG. 10A depicts the combined use of air heating and floor heating from the start. As shown FIG. 10A, the solenoid valve V2 is controlled to be "CLOSE" in every period. The contents of FIG. 10B corresponds to thereof FIG. 6. Specifically, FIG. 10B depicts the operation mode in which only air heating is operated at first and floor heating is jointly operated later. As shown FIG. 10B, the solenoid valve is controlled to be "CLOSE" in period ② and ③.

Numerous other modifications and variations of the present invention are possible in light of the above teachings. It is therefore to be understood that, within the scope of the appended claims, the present invention can be practiced in a manner other than as specifically described herein.

What is claimed is:

1. A heat pump type heating apparatus having an internal unit and an external unit, the apparatus comprising:

an internal heat-exchanger arranged in the internal unit, the internal heat-exchanger heating the air surrounding it;

a floor heating panel arranged in the floor of the internal unit, the floor heating panel heating the floor surface surrounding it;

a first temperature detection sensor arranged close to the internal heat-exchanger to output a temperature signal indicating the temperature of the air;

a second temperature detection sensor arranged close to the floor heating panel to output a temperature signal indicating the temperature of the area near the floor surface;

a controller having a setting section, a comparing section, and a controlling section, wherein the setting section inputs desired room temperature data and desired floor temperature data, the comparing section compares the desired room temperature with the output signal from the first temperature detection sensor and the desired floor temperature with the output signal from the second temperature detection sensor respectively, the controlling section controls the internal heat-exchanger and the floor heating panel in response to the results of the comparing section, the controller further including a compensating unit which operates to change a preset room temperature by a specified value in response to an output based on the floor temperature comparison;

an internal fan device arranged close to the internal heat-exchanger to supply air flow to the internal heat-exchanger;

a variable capacity compressor disposed in the external unit to compress a gaseous refrigerant fluid to be supplied to the internal heat-exchanger and the floor heating panel; and an inverter circuit to supply a variable driving frequency to the compressor.

2. A method for controlling a heat pump type apparatus having a variable capacity compressor operating in response to a change in the temperature of a space being heated, an internal heat-exchanger which heats the whole space, a floor heating panel which heats a floor around the space, a mode setting section allowing selection of an air heating mode using the internal heat-exchanger, a floor heating mode using the floor heating panel, and a combined use mode using both the internal heat-exchanger and the floor heating panel, and a temperature setting section allowing a desired temperature of the whole space to be set as a preset room temperature and a desired temperature of the floor as a preset floor temperature, including the steps of:

distinguishing whether the combined use mode is selected or not;

detecting the floor temperature in the space:

comparing the floor temperature with the preset floor temperature; and compensating the preset room temperature by a specified value in response to the results of said comparing.

3. A heat pump type heating apparatus having an internal unit and an external unit, the apparatus comprising:

(a) an internal heat-exchanger located in the internal unit, the internal heat-exchanger heating air surrounding it;

(b) a floor heating panel located in a floor of the internal unit, the floor heating panel heating a floor surface surrounding it;

(c) a first temperature detection sensor coupled to the internal heat-exchanger to output a first temperature signal indicating the temperature of the air;

(d) a second temperature detection sensor coupled to the floor heating panel to output a second temperature signal indicating the temperature of an area near the floor surface;

(e) a controller having a setting section, a comparing section, a controlling section, an operating mode setting unit, a room temperature comparison unit, a floor temperature comparison unit and a compensating unit, wherein the setting section inputs desired room temperature data and desired floor temperature data, the comparing section compares a desired room temperature with the first temperature signal from the first temperature detection sensor and a desired floor temperature with the second temperature signal from the second temperature detection sensor, the controlling section controls the internal heat-exchanger and the floor heating panel in response to results from the comparing section, the operating mode setting unit allows an operator to select air heating, floor heating, or both, the room temperature comparison unit makes a comparison between room temperature as detected by the first temperature detection sensor and a preset room temperature, the floor temperature comparison unit makes a comparison between floor temperature as detected by the second temperature detection sensor and a preset floor temperature, and the compensating unit operates to change the preset room temperature by a specified value in response to an output from the floor temperature comparison unit;

(f) an internal fan to supply air flow to the internal heat-exchanger;

(g) a variable capacity compressor located in the external unit to compress a gaseous refrigerant fluid to be supplied to the internal heat-exchanger and the floor heating panel; and (h) an inverter circuit to supply a variable driving frequency to the compressor.

4. An apparatus according to claim 3, wherein the internal unit includes a plurality of valves to adjust flow of the gaseous refrigerant fluid.

5. An apparatus according to claim 3, wherein the controller further includes an inverter circuit control unit, an internal fan control unit and a valve control unit, wherein the inverter circuit control unit changes an output frequency of the inverter circuit, the internal fan control unit changes a rotational speed of the internal fan, and the valve control unit operates the opening and closing of valves in response to the room temperature comparison unit and the floor temperature comparison unit.

6. An apparatus according to claim 3, further including an external heat-exchanger and an expansion valve connected in series.

7. An apparatus according to claim 4, wherein the internal heat-exchanger and the floor heating panel are connected to the compressor in parallel through the valves.

8. An apparatus according to claim 4, wherein the valves are solenoid valves.

9. An apparatus according to claim 6, further including an assembly to change the direction of the gaseous refrigerant fluid from the compressor.

10. An apparatus according to claim 6, futher including an external fan to supply air flow to the external heat-exchanger.

11. A heat pump type heating apparatus having an internal unit and an external unit, the apparatus comprising:

(a) an internal heat-exchanger located in the internal unit, the internal heat-exchanger heating air surrounding it;
(b) a floor heating panel located in a floor of the internal unit, the floor heating panel heating a floor surface surrounding it;
(c) a first temperature detection sensor to output a first temperature signal indicating the temperature of the air;
(d) a second temperature detection sensor to output a second temperature signal representing the temperature of the floor surface; and
(e) a controller having a setting section, a comparing section, a controlling section, an operating mode setting unit, a room temperature comparison unit, a floor temperature comparison unit and a compensating unit, wherein the setting section inputs desired room temperature data and desired floor temperature data, the comparing section compares a desired room temperature with the first temperature signal from the first temperature detection sensor and a desired floor temperature with the second temperature signal from the second temperature detection sensor, the controlling section controls the internal heat-exchanger and the floor heating panel in response to results from the comparing section, the operating mode setting unit allows selection of air heating, floor heating, or both, the room temperature comparison unit makes a comparison between room temperature as detected by the first temperature detection sensor and a preset room temperature, the floor temperature comparison unit makes a comparison between floor temperature as detected by the second temperature detection sensor and a preset floor temperature, and the compensating unit changes the preset room temperature by a specified value in response to an output from the floor temperature comparison unit.

* * * * *